Figure 1:
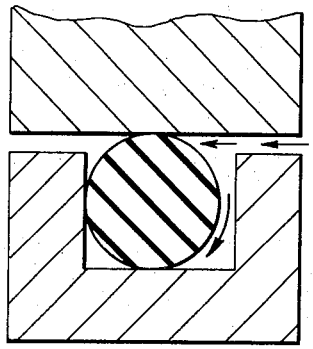

United States Patent
Lambie

[15] 3,693,986
[45] Sept. 26, 1972

[54] SEALING DEVICES
[72] Inventor: John Walkinshaw Lambie, 13 Cuillin Place, Kilmarnock, Ayrshire, Scotland
[22] Filed: Oct. 26, 1970
[21] Appl. No.: 83,829

[30] Foreign Application Priority Data
    Oct. 25, 1969    Great Britain..........52,388/69

[52] U.S. Cl. ..................277/188, 277/166, 277/187, 277/207
[51] Int. Cl. ..........................F16j 15/00, F16j 15/32
[58] Field of Search......277/188, 166, 167, 207, 187, 277/165, 144, 190, 177, 176, 141, 143, 138; 251/307

[56] References Cited

UNITED STATES PATENTS
2,665,461    1/1954    Rodgers.....................277/187
2,732,268    1/1956    Duval........................277/187

FOREIGN PATENTS OR APPLICATIONS
5,549    3/1905    Great Britain.............277/166

*Primary Examiner*—Houston S. Bell, Jr.
*Attorney*—George S. Schwind

[57] ABSTRACT

A fluid seal for a disc valve or the like wherein a resilient seal is confined within a circumferential recess in the valve body which has a projecting ledge on at least one side of said recess. At lease one gib strip is positioned between the seal and the projecting ledge. One side of the gib strip has a stepped portion to present a projecting ledge whereby the strip and seal are retained resiliently between the side wall of the recess and the resilient seal. A second embodiment discloses the use of the gib strips and corresponding ledges on each side of the resilient seal.

6 Claims, 5 Drawing Figures

SEALING DEVICES

This invention relates to a fluid seal of the type intended to prevent leakage of fluid through a clearance gap.

The device is applicable to a continuous seal, e.g. a ring seal employing an O-ring, and to a linear seal, e.g. on the face of a dock gate.

Seals as at present known employing separate sealing strips located in grooves suffer from certain disadvantages. A sealing strip which is to be used in a position where the clearance gap between the surfaces to be sealed is large tends to be forced by the pressure of the fluid against which the seal operates out of the groove containing it and to be extruded through the clearance gap. A similar effect is often found to occur in situations where the sealing strip requires to be brought out of contact with the other sealing surface, an example being the face seal on a valve obturator disc. In such a situation the flow of fluid at high velocity passing over the sealing strip, usually an O-ring, and the face with which the O-ring is normally engageable causes a venturi effect over the projecting curved portion of the O-ring and the pressure differential then tends to lift the O-ring out of its groove. Various proposals have been made to overcome this difficulty. For example the groove may be undercut so that the side faces are formed with overhanging shoulders projecting towards one another, the ring when being put in place being forced into the groove so that a portion of it extends below and expands into the undercut. In another construction one side wall of the groove is inclined to provide an overhang and a keeper ring having a tapered side face inclined to provide an overhang is inserted into the groove after the ring has been placed in position so that the sealing ring is held in a groove of dove-tailed cross section. Both these constructions suffer from their own particular disadvantages. In the construction employing the groove formed with the overhanging shoulders the ring is difficult to insert without damaging it and is also difficult to remove when it has to be replaced, while the construction employing the keeper ring requires a large face to hold the seal because the keeper ring requires some form of fixing e.g. screws to hold it in place.

It is an object of the present invention to provide a fluid seal which is easy and cheap to provide, which requires little more room than the simplest type of O-ring, and which incorporates a sealing strip which can be fitted easily and without damage and can be removed comparatively easily.

According to the present invention a fluid seal for sealing a gap between the juxtaposed faces of two elements incorporates the features that the face of one element is formed with a groove both side walls of which are undercut to overhang the bottom of the groove, at least one of the undercuts being in the form of a shoulder, a resilient sealing strip rests in the groove, and at least one gib strip having one side face stepped to present a projecting ledge and the other side face sloped inwards to form an overhang is contained in the groove with the ledge on the gib strip engaging under the shoulder in the side wall of the groove and being held then by the resilient thrust of the sealing strip, the sealing strip being retained in the groove by the gib strip.

In certain applications particularly where sealing strips of large cross section are to be employed it may be convenient to provide two gib strips, both side walls of the groove being undercut to present shoulders, the gib strips being opposite handed in cross section so that when the fluid seal is assembled the sealing strip is held between the two gib strips the ledges of which are engaged with the respective shoulders in the groove.

The arrangement described is applicable to a face seal i.e. a seal formed on a planar face. This type of seal is particularly of use in connection with pump valves. In this application the seal is usually annular in form, the gib strip and the sealing strip being correspondingly shaped.

Another use for a face seal is in sealing the gate of a gate valve. The groove may be continuous and rectangular in plan, the corners being formed as curves.

The seal is applicable also to cylindrical surfaces and may be formed as an external or an internal seal i.e. the groove may be formed on the external cylindrical surface of a cylindrical object, or on the inner cylindrical face of a hollow object formed with a bore, the groove being an annular groove and the gib strip and the sealing strip being rings.

The gib strip may be of metal or of a hard non-metallic substance, e.g. a hard plastics material. A suitable substance with an application to a wide variety of conditions is P.T.F.E.

The accompanying drawings illustrate various types of known seals and seals according to the invention. In particular, FIG. 1 is a cross section of an ordinary O-ring seal, FIG. 2 a cross section of a seal in which the side faces of the grooves are undercut whereby to trap the sealing ring in place, FIG. 3 is a cross section of a seal employing a keeper ring held in place by set screws, FIG. 4 is a cross section of a seal according to the invention employing one gib strip and FIG. 5 is a cross section of a seal according to the invention employing two gib strips.

Figure 2:
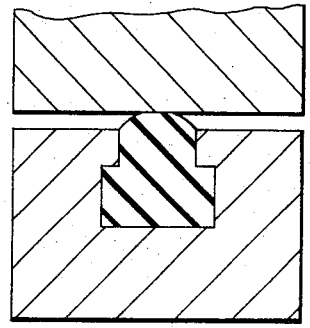
Figure 3:
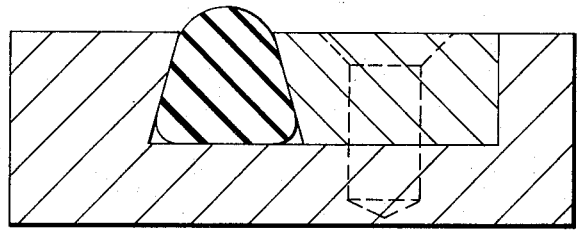
Figure 4:
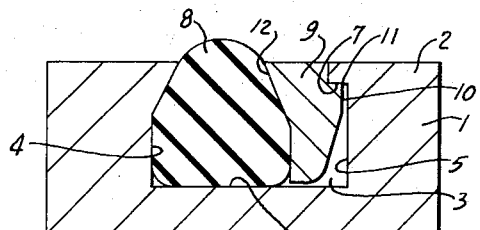
Figure 5:
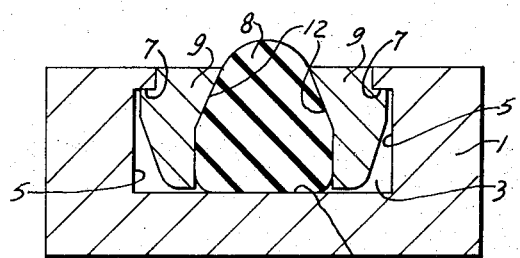

As the constructions of FIGS. 1, 2 and 3 are already well known only the constructions according to the invention and as illustrated in FIG. 4 and 5 will be described.

In FIG. 4, 1 denotes one element the face 2 of which is formed with a groove 3 both side walls 4 and 5 of which are undercut to overhang the bottom 6 of the groove 3. The undercut in the wall 5 is in the form of a shoulder 7. 8 denotes a sealing strip resting in the groove 3 and 9 denotes a gib strip having one side face 10 stepped to present a projecting ledge 11 and the other side face 12 sloping inwards. The sealing strip 8 in trying to regain its undistorted shape presses against the side face 12 of the gib strip 9 and holds the projecting ledge 11 thereon in engagement with the shoulder 7 so that the gib strip 9 cannot come out while the overhang of the side wall 4 of the groove 3 and of the side face 12 of the gib strip 9 hold the sealing strip 8 in place. The construction of FIG. 5 differs from that of FIG. 4 only in that it employs two gib strips, both side walls 4 and 5 of the groove 3 being accordingly undercut and the gib strips 9 being opposite-handed.

In practice and referring to FIGS. 4 and 5, a seal is made by inserting the sealing strip 8 into the groove 3 in the element 1 and then pressing the gib strip 9 into place. The gib strip 9 compresses the sealing strip 8 as it moves into the groove 3 and the transverse resilient thrust of the sealing strip 8 then causes the ledge 11 on the gib strip 9 to engage under the shoulder 7 in the groove 3 thereby locking both the gib strip 9 and the sealing strip 8 in place. In such a seal a small portion of the sealing strip 8 protrudes from the groove and provides the sealing action while the sealing strip is gripped tightly enough to prevent ingress of fluid under pressure down the side face of the strip. It is such ingress of fluid which causes the extrusion or the lifting of a sealing strip such as that illustrated in FIG. 1 in conditions where the juxtaposed faces have been moved just far enough apart to cause the seal to be broken. As the ledge 11 on the gib strip 9 and the shoulder 7 in the groove 3 can be small in width in proportion to the width of the groove 3 it has been found that the gib strip 9 is easily inserted in place and the seal takes up little more room than an ordinary O-ring seal using a groove of rectangular section such as is illustrated in FIG. 1. It may be found convenient for assembly purposes in annular seals to form the gib strip 9 as a discontinuous ring. This is not a disadvantage, however, because the ends lie in abutting relationship when the ring is in place and in any event, the gib ring may be placed on the higher pressure side of the seal so that the effect of the extremely small gap between the abutting ends of the strip forming the gib ring does not cause any leakage through the seal.

What we claim is:

1. A fluid seal for sealing a gap between the juxtaposed faces of two elements incorporating the features that the face of one element is formed with a groove both side walls of which are undercut to overhang the bottom of the groove, at least one of the undercuts being in the form of a shoulder, a resilient sealing strip rests in the groove, and at least one gib strip having one side face stepped to present a projecting ledge and the other side face sloped inwards to form an overhang is contained in the groove with the ledge on the gib strip engaging under the shoulder in the side wall of the groove and being held then by the resilient thrust of the sealing strip, the sealing strip being retained in the groove by the gib strip.

2. A fluid seal as claimed in claim 1 incorporating two gib strips, both side walls of the groove being undercut to present shoulders, the gib strips being opposite handed in cross section so that when the fluid seal is assembled the sealing strip is held between the two gib strips the ledges of which are engaged with the respective shoulders in the groove.

3. A fluid seal as claimed in claim 1 in which the face formed with the groove is a planar face, the groove being a continuous groove in said face the gib strip and the sealing strip being correspondingly shaped.

4. A fluid seal as claimed in claim 3 in which the groove is rectangular in plan, the corners being formed as curves.

5. A fluid seal as claimed in claim 1 in the face formed with the groove is a cylindrical face, the groove being an annular groove, the gib strip and the sealing strip being rings.

6. A fluid seal for sealing a gap between the juxtaposed faces of two elements,
   the face of one element having therein a groove with a pair of opposed side walls, both of which are undercut to overhang the bottom of the groove,
   one undercut being constituted as a lateral shoulder,
   a resilient sealing strip seated in the groove,
   a gib strip seated in the groove between the sealing strip and the shouldered wall of the groove and having a side face stepped to present a lateral ledge engaged beneath said groove wall shoulder,
   the other side face of the gib strip having an overhang compressing the sealing strip inwardly in the groove and laterally toward said shoulder, thereby holding the ledge locked beneath the shoulder,
   the sealing strip being held in the groove by the gib strip when its ledge is engaged beneath said groove wall shoulder.

* * * * *